PROCESS FOR VULCANIZING MIXES COMPRISING AMORPHOUS LINEAR COPOLYMERS AND ACID FILLERS

Romano Matteucci and Gian Vittorio Giandinoto, Ferrara, Italy, assignors to Montecatini Società Generale per l'Industria Mineraria e Chimica, Milan, Italy
No Drawing. Filed July 18, 1960, Ser. No. 43,309
Claims priority, application Italy, July 23, 1959, 12,507/59
8 Claims. (Cl. 260—41)

This invention relates to a process for vulcanizing saturated olefin polymers and copolymers and more particularly to a process for vulcanizing certain special copolymers of ethylene and propylene, with organic percompounds and in the presence of acid fillers.

The vulcanization of dienic elastomers with organic peroxides is influenced unfavorably by the acidity of the filler, and the vulcanization can be improved by the simple addition of basic substances to the mix to be vulcanized.

We have discovered, however, that in the case of the saturated linear amorphous homopolymers and copolymers of the alpha-olefins, $CH_2=CHR$, where R is hydrocarbon, which can be vulcanized with peroxides and sulfur orquinonic compounds by the process described in Italian Patent No. 587,681 and the first addition thereto, the vulcanization (cross-linking) is often seriously hindered by the presence of acid fillers.

A satisfactory vulcanization of those linear, amorphous homopolymers and copolymers of the higher alpha-olefins is not obtained either by using an excess of the peroxide or by including basic substances, e.g., metal oxides, in the polymer. In many cases, when a metal oxide is added to the polymer before it is vulcanized, the results of the vulcanization are worse than when basic substances are omitted.

The problems involved in vulcanizing the linear, amorphous homopolymers and copolymers are particularly complex. In order to obtain satisfactory vulcanized products when acid fillers are used it is necessary to use particular starting compositions and processing conditions.

One object of this invention is to provide a process for vulcanizing the alpho-olefin homopolymers and copolymers in the presence of acid fillers and without reducing or hindering the cross-linking reaction which is the normal result of vulcanizing those polymers.

This and other objects of the invention are attained by incorporating in the polymer to be vulcanized, and in addition to the acid fillers, particular basic substances, and by subjecting the mix to suitable pre-treatment.

According to one embodiment of the invention, we have discovered that very good vulcanization results are obtained by mixing with the polymer containing the said filler, and as corrective basic substances, the oxides, hydroxides, basic salts and weak acid salts of metals belonging to the 1st, 2nd, 3rd or 8th group of the Mendeléeff Periodic Table. The amount of the basic substance to be used varies from 0.1 to 20% by weight of the filler. The basic metal oxides, hydroxides, etc. are added to the mix together with a selected amount, varying from 0.1% to 10% by weight, based on the acid filler weight, of certain organic basic substances such as, e.g., diphenyl guanidine, hexamethylene diamine, pyridine, triethanolamine, etc., or of a basic organic product obtained by the condensation of ammonia, formaldehyde and ethyl chloride (e.g., the compound marketed as "Vulcafor" EFA), the mixture of thiazole and hexamethylene tetramine marketed as "Vulcafor" FN, etc.

In accordance with another modification of the invention, in order to increase the effectiveness of the aforementioned metal oxides etc. and organic basic substances, the following procedure is followed—

(1) The copolymer is first mixed with the acid filler in a Banbury mixer or the like at a temperature of 100° C. to 160° C., preferably at 130° C.;

(2) The selected metal oxide, hydroxide, etc. and the selected organic basic substance is added after the filler, again by mixing the mass in a Banbury mixer at a temperature between 100° C. and 160° C., preferably at 130° C.;

(3) The mix is worked at the temperature of 100° C. to 160° C., preferably 130° C., for about 10 to 15 minutes;

(4) The vulcanizing agents (sulfur and an organic percompound) are incorporated in the mass in a roll mixer at a temperature of 5° C. to 50° C., preferably at 20° C. to 30° C.

It appears that any organic peroxide can be used in our process. However, particularly outstanding results have been obtained by using a peroxide of the formula

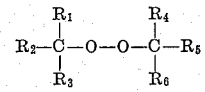

in which $R_1$, $R_2$, $R_3$, $R_4$, $R_5$ and $R_6$ are alkyl or aryl radicals.

The peroxide is added to the mix in an amount between 0.5 and 10% by weight based on the weight of the copolymer in the mix. The sulfur is used in an amount between 0.3 and 1.5 gram atoms, preferably 1 gram atom sulfur per mole of the peroxide.

The vulcanization is carried out according to the modalities and conditions described in Italian Patent No. 587,681 and preferably according to those described in the first patent of addition filed on July 7, 1959, by the assignee of the present application.

The ethylene-propylene, ethylene-butene copolymers which are vulcanized are the linear, amorphous copolymers as disclosed in the pending application of Natta et al., Ser. No. 629,085, and which are substantially free of homopolymers of the respective starting monomers. The copolymers contain from 40 to 65 mols percent of propylene in the copolymer molecule and have a molecular weight comprised between 60,000 and 500,000, preferably between 80,000 and 220,000.

The following examples are illustrative but not limitative of our invention. The tension tests referred to in the examples were carried out by cutting, from vulcanized sheets having size of 120 x 120 x 2 mm. and prepared in a press, specimens of the C-type according to ASTM D412 and subjecting the same to tension with a separation rate of the grips of 500 mm. per minute. The residual elongation was determined on specimens having a useful portion of 5 mm., kept under tension at an elongation of 200% for one hour and then released, measuring its length after one minute. As the modulus of elasticity mentioned in the examples we mean the charge value at 300% elongation.

Example 1

100 parts of a linear, amorphous ethylene-propylene copolymer according to Natta et al. and having a molecular weight of 60,000 and containing 47.5% of propylene by mols were worked in a Banbury mixer at 130° C. until a plastic mass was obtained. 0.5 part of 2,6-tert.-butyl-4-methylphenol ("Catalin" AC/3), 100 parts china clay (kaolin), 2 parts lead oxide, and 1 part "Vulcafor" EFA (condensation product of ammonia, formaldehyde and ethyl chloride) were then added. The mass was homogenized and then warm mixed for a further 10 minutes.

The mix was cooled and 0.36 part sulfur and 3 parts cumyl peroxide were added, in a roll mixer at 25–30° C. The product thus obtained was vulcanized in a press at 160° C. for 95 minutes thus obtaining sheets having a size of 120 x 120 x 2 mm. The C-type specimens, prepared according to ASTM D412, subjected to tensile tests, gave the following mechanical characteristics:

Tensile strength _____ kg./cm.$^2$__ 51
Elongation at break _____ percent__ 410
Modulus of elasticity _____ kg./cm.$^2$__ 38
Residual elongation _____ percent__ 13

*Example 2*

Proceeding as in Example 1, there was obtained a mix containing 100 parts of the copolymer of Example 1, 0.5 part 2,6-tert.-butyl-4-methylphenol ("Catalin" AC/3), 100 parts china clay, 2 parts magnesium oxide, 1 part "Vulcafor" EFA (condensation product of ammonia, formaldehyde and ethyl chloride) 0.36 part sulfur and 3 parts cumyl peroxide.

The product vulcanized in a press at 160° C. for 45 minutes presents the following mechanical characteristics:

Tensile strength _____ kg./cm.$^2$__ 45
Elongation at break _____ percent__ 410
Modulus of elasticity _____ kg./cm.$^2$__ 40
Residual elongation _____ percent__ 13

*Example 3*

The procedure of Example 1 was repeated to obtain a mix containing 100 parts of the copolymer used in Example 1, 0.5 part 2,6-tert.-butyl-4-methylphenol ("Catalin" AC/3), 100 parts china clay, 2 parts lead oxide, 1 part "Vulcafor" FN (activated thiazole and hexamethylene tetramine), 0.36 part sulfur and 3 parts cumyl peroxide. The product vulcanized in a press at 160° C. for 45 minutes, presents the following mechanical characteristics:

Tensile strength _____ kg./cm.$^2$__ 49
Elongation at break _____ percent__ 600
Modulus of elasticity _____ kg./cm.$^2$__ 31
Residual elongation _____ percent__ 13

*Example 4*

Using the technique of Example 1, there was prepared a mix containing 100 parts of the copolymer used in Example 1, 0.5 part 2,6-tert.-butyl-4-methylphenol ("Catalin" AC/3), 100 parts china clay, 2 parts lead oxide, 1 part hexamethylene diamine, 0.36 part sulfur and 3 parts cumyl peroxide. The product vulcanized in a press at 160° C. for 45 minutes had the following mechanical characteristics:

Tensile strength _____ kg./cm.$^2$__ 52
Elongation at break _____ percent__ 570
Modulus of elasticity _____ kg./cm.$^2$__ 35
Residual elongation _____ percent__ 13

*Example 5*

Proceeding as in Example 1, a mix containing 100 parts of the copolymer used in Example 1, 0.5 part 2,6-tert.-butyl-4-methylphenol ("Catalin" AC/3), 100 parts china clay, 2 parts magnesium oxide, 1 part "Vulcafor" EFA (condensation product of ammonia, formaldehyde and ethyl chloride), 0.36 part sulfur and 2.35 parts cumyl tert. butyl peroxide was prepared. The product, after being vulcanized in a press at 160° C. for 45 minutes, had the following mechanical characteristics:

Tensile strength _____ kg./cm.$^2$__ 49
Elongation at break _____ percent__ 550
Modulus of elasticity _____ kg./cm.$^2$__ 32
Residual elongation _____ percent__ 15

*Example 6*

Example 1 was repeated to obtain a mix containing 100 parts of the copolymer used in Example 1, 0.5 part 2,6-tert.-butyl-1,4-methylphenol ("Catalin" AC/3), 100 parts china clay, 2 part magnesium oxide, 1 part diphenyl guanidine, 0.36 part sulfur and 2.35 parts cumyl-tert-butyl peroxide. The product, after being vulcanized in a press at 160° C. for 45 minutes, presented the following mechanical characteristics:

Tensile strength _____ kg./cm.$^2$__ 45
Elongation at break _____ percent__ 550
Modulus of elasticity _____ kg./cm.$^2$__ 32
Residual elongation _____ percent__ 15

*Example 7*

Using the same technique as that of Example 1, we prepared a mix containing 100 parts of the copolymer used in Example 1, 0.5 part 2,6-tert.-butyl-4-methylphenol ("Catalin" AC/3), 100 parts iceberg kaolin, 2 parts lead oxide, 1 part "Vulcafor" EFA (condensation product of ammonia, formaldehyde and ethyl chloride), 0.31 part sulfur and 2 parts cumyl-tert.-butyl peroxide. After the mix was vulcanized in a press at 160° C. for 45 minutes, it showed the following mechanical characteristics:

Tensile strength _____ kg./cm.$^2$__ 55
Elongation at break _____ percent__ 500
Modulus of elasticity _____ kg./cm.$^2$__ 47
Residual elongation _____ percent__ 12

*Example 8*

Proceeding as in Example 1, there was prepared a mix containing 100 parts of the copolymer used in Example 1, 0.5 part 2,6-tert.-butyl-4-methylphenol ("Catalin" AC/3), 100 parts iceberg kaolin, 2 parts lead oxide, 1 part diphenyl guanidine, 0.31 part sulfur and 2 parts cumyl-tert.-butyl peroxide. The product, vulcanized in a press at 160° C. for 45 minutes, presents the following mechanical characteristics:

Tensile strength _____ kg./cm.$^2$__ 50
Elongation at break _____ percent__ 520
Modulus of elasticity _____ kg./cm.$^2$__ 43
Residual elongation _____ percent__ 12

*Example 9*

Using the same technique as that of Example 1, a mix containing 100 parts of the copolymer used in Example 1, 0.5 part 2,6-tert.-butyl-4-methylphenol ("Catalin" AC/3), 50 parts carbon black HPC, 2 parts magnesium oxide, 1 part "Vulcafor" EFA (condensation product of ammonia, formaldehyde and ethyl-chloride), 0.36 part sulfur and 3 parts cumyl peroxide, was prepared. The product, vulcanized in a press at 160° C. for 45 minutes, presents the following mechanical characteristics:

Tensile strength _____ kg./cm.$^2$__ 230
Elongation at break _____ percent__ 420
Modulus of elasticity _____ kg./cm.$^2$__ 115
Residual elongation _____ percent__ 9

*Example 10*

Using the procedure of Example 1, there was obtained a mix containing 100 parts of the copolymer used in Example 1, 0.5 part 2,6-tert.-butyl-4-methylphenol ("Catalin" AC/3), 30 parts silica ("Ultrasil"), 2 parts magnesium oxide, 1 part "Vulcafor" EFA, 0.36 part sulfur and 3 parts cumyl peroxide. The product was vulcanized in a press at 160° C. for 45 minutes, after which it had the following mechanical characteristics:

Tensile strength _____ kg./cm.$^2$__ 160
Elongation at break _____ percent__ 620
Modulus of elasticity _____ kg./cm.$^2$__ 40
Residual elongation _____ percent__ 12

*Example 11*

Repeating the technique of Example 1, a mix containing 100 parts of the copolymer used in Example 1, 0.5 part 2,6-tert.-butyl-4-methylphenol ("Catalin" AC/3), 30 parts silica ("Ultrasil"), 2 parts magnesium oxide, 1 part "Vulcafor" EFA, 0.31 part sulfur and 2 parts cumyl-tert.-buyl peroxide was prepared. The mix was vulcanized in a press at 165° C. for 45 minutes. It had the following mechanical characteristics after vulcanization:

Tensile strength _____ kg./cm.² __ 180
Elongation at break _____ percent __ 650
Modulus of elasticity _____ kg./cm.² __ 35
Residual elongation _____ percent __ 12

The foregoing examples demonstrate that the linear, amorphous copolymers of the alpha-olefins, $CH_2=CHR$, in which R is hydrocarbon can be vulcanized successfully in the presence of acid fillers, when the corrective basic substances are used and the conditions of the present process are observed.

Since various changes can be made in practicing the invention without departing from its spirit, we intend to include in the scope of the appended claims all such variations and modifications as may be apparent to those skilled in the art from the description and examples given herein.

*Example 12*

100 parts ethylene-butene copolymer having a molecular weight of 100,000 and containing 40.5% butene by mols are worked in a Banbury mixer at 130° C. until the mass is sufficiently plastic; 0.5 part 2,6-tert.-butyl-4-methylphenol ("Catalin" AC/3), 100 parts china clay (kaolin), 2 parts lead oxide and 1 part Vulcafor EFA (condensation product of ammonia, formaldehyde and ethyl chloride) are then added.

The whole is homogenized and then mixed for further 10 minutes at 130° C.

The mix is then cooled and in a roll mixer at 25–30° C. 0.36 part sulfur and 3 parts cumyl peroxide are added.

The product thus obtained is vulcanized in a press at 160° C. for 45 minutes to obtain sheets with size of 120 x 120 x 2 mm.

The specimens of the C-type according to ASTM D412 present the following mechanical characteristics:

Tensile strength _____ kg./cm.² __ 48
Elongation at break _____ percent __ 460
Modulus of elasticity _____ kg./cm.² __ 34
Residual elongation _____ percent __ 14

What is claimed is:

1. A process for vulcanizing an amorphous linear copolymer of ethylene and propylene in admixture with acid fillers, which process comprises first mixing at from 100° to 160° C. the copolymer with an acid filler selected from the group consisting of silica, channel carbon black, and clay to form a first mixture, then incorporating in the first mixture from about 3% to 10% of a second mixture of two basic substances A and B, where A is an inorganic substance selected from the group consisting of magnesium oxide and lead oxide and B is an organic substance selected from the group consisting of diphenyl guanidine, and a condensation product of ammonia, formaldehyde and ethyl chloride, the ratio of A to B in said second mixture being about 2 to 1, working the resulting mass for a time between 5 minutes and 20 minutes and then incorporating at from 5° to 50° C. in the mass from 0.5 to 10% by weight based on the weight of the copolymer of an organic peroxide and from 0.3 to 1.5 gram atoms of sulphur per mole of organic peroxide and finally heating the mass of vulcanization temperature.

2. The process according to claim 1, characterized in that the corrective basic substance is incorporated in the mixture of the copolymer and acid filler at a temperature between 100° C. and 160° C.

3. The process according to claim 1, characterized in that the acid filler is mixed with the copolymer at a temperature of 130° C., and the corrective basic substance is incorporated in the mixture of the copolymer and acid filler at a temperature of 130° C.

4. The process according to claim 1, characterized in that the sulfur and organic peroxide are added to the mass in amounts such that the concentration of sulfur in the mass is 1 gram atom sulfur per mole of the organic peroxide.

5. The process according to claim 1, characterized in that the sulfur and organic peroxide are incorporated in the mass at a temperature of from 20° C. to 30° C.

6. The process according to claim 1, characterized in that the organic peroxide has the formula

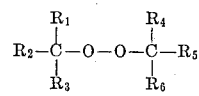

in which $R_1$, $R_2$, $R_3$, $R_4$, $R_5$ and $R_6$ represent radicals selected from the group consisting of alkyl and aryl radicals.

7. The process according to claim 1, characterized in that the copolymer is a copolymer of ethylene and propylene containing from 40 to 65 mols percent of ethylene in the copolymer molecule and having an average molecular weight between 60,000 and 500,000.

8. The process according to claim 1, characterized in that the copolymer is a copolymer of ethylene and propylene containing from 40 to 65 mols percent of ethylene in the copolymer molecule and having an average molecular weight between 80,000 and 220,000.

References Cited by the Examiner

UNITED STATES PATENTS

| | | |
|---|---|---|
| 2,628,214 | 2/1953 | Pinkney et al. |
| 2,692,870 | 10/1954 | Pechukas _____ 260—785 |
| 2,927,904 | 3/1960 | Cooper. |
| 2,928,801 | 3/1960 | Safford et al. _____ 260—41 |
| 2,930,083 | 3/1960 | Vostovich et al. |
| 2,958,672 | 11/1960 | Goldberg. |
| 2,975,159 | 3/1961 | Weinmayr _____ 260—805 |
| 2,983,714 | 5/1961 | Robinson et al. _____ 260—79.5 |
| 3,012,016 | 12/1961 | Kirk et al. _____ 260—79.5 |

FOREIGN PATENTS 564,040   9/1958   Canada.

ALEXANDER H. BRODMERKEL, *Primary Examiner.*

DANIEL ARNOLD, LEON J. BERCOVITZ, MORRIS LIEBMAN, *Examiners.*

E. F. McKINNEY, B. S. LEON, K. B. CLARKE, A. LIEBERMAN, *Assistant Examiners.*